US012600884B2

(12) United States Patent
Emslander et al.

(10) Patent No.: US 12,600,884 B2
(45) Date of Patent: Apr. 14, 2026

(54) LINERLESS FILM STACK

(71) Applicant: 3M INNOVATIVE PROPERTIES COMPANY, St. Paul, MN (US)

(72) Inventors: Jeffrey O. Emslander, Grant, MN (US); Huiwen Tai, Lake Elmo, MN (US); John A. Nielsen, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 226 days.

(21) Appl. No.: 18/026,673

(22) PCT Filed: Oct. 8, 2021

(86) PCT No.: PCT/IB2021/059245
§ 371 (c)(1),
(2) Date: Mar. 16, 2023

(87) PCT Pub. No.: WO2022/079558
PCT Pub. Date: Apr. 21, 2022

(65) Prior Publication Data
US 2023/0348756 A1 Nov. 2, 2023

Related U.S. Application Data

(60) Provisional application No. 63/091,862, filed on Oct. 14, 2020.

(51) Int. Cl.
*C09J 7/29* (2018.01)
*B32B 7/06* (2019.01)
(Continued)

(52) U.S. Cl.
CPC ...... *C09J 7/29* (2018.01); *B32B 7/06* (2013.01); *B32B 7/12* (2013.01); *B32B 27/08* (2013.01);
(Continued)

(58) Field of Classification Search
CPC ............ B32B 2250/05; B32B 2250/24; B32B 2250/40; B32B 2264/0214;
(Continued)

(56) References Cited

U.S. PATENT DOCUMENTS

| 3,929,703 A | 12/1975 | Weymann et al. |
| 4,425,176 A | 1/1984 | Shibano et al. |
| (Continued) | | |

FOREIGN PATENT DOCUMENTS

| EP | 0259968 B1 | 2/1993 |
| JP | S 55-152775 A | 11/1980 |
| (Continued) | | |

OTHER PUBLICATIONS

International Search Report for PCT Application No. PCT/IB2021/059245, mailed on Jan. 12, 2022, 3 pages.

*Primary Examiner* — Lawrence D Ferguson
(74) *Attorney, Agent, or Firm* — Julie Lapos-Kuchar; Daniel J. Iden

(57) ABSTRACT

A film stack is described. In particular, a film stack that includes a co-extrudable first base substrate, a first pressure sensitive adhesive, a release layer, a second pressure sensitive adhesive, and a second base substrate is described. Such film stacks may benefit from reduced waste, simpler manufacturing, and a thinner overall construction versus conventional film stacks.

14 Claims, 1 Drawing Sheet

(51) Int. Cl.

| | |
|---|---|
| *B32B 7/12* | (2006.01) |
| *B32B 27/08* | (2006.01) |
| *B32B 27/30* | (2006.01) |
| *B32B 27/32* | (2006.01) |
| *B32B 27/34* | (2006.01) |
| *B32B 27/36* | (2006.01) |
| *B32B 27/40* | (2006.01) |
| *C09J 133/08* | (2006.01) |

(52) U.S. Cl.

CPC .......... *B32B 27/306* (2013.01); *B32B 27/308* (2013.01); *B32B 27/32* (2013.01); *B32B 27/34* (2013.01); *B32B 27/36* (2013.01); *B32B 27/40* (2013.01); *C09J 133/08* (2013.01); *B32B 2250/05* (2013.01); *B32B 2250/24* (2013.01); *B32B 2250/40* (2013.01); *B32B 2307/412* (2013.01); *B32B 2307/414* (2013.01); *B32B 2307/7376* (2023.05); *B32B 2307/748* (2013.01); *C09J 2301/122* (2020.08); *C09J 2467/006* (2013.01); *C09J 2477/006* (2013.01)

(58) Field of Classification Search

CPC ........ B32B 2264/101; B32B 2264/107; B32B 2307/412; B32B 2307/414; B32B 2307/732; B32B 2307/7376; B32B 2307/748; B32B 27/08; B32B 27/20; B32B 27/306; B32B 27/308; B32B 27/32; B32B 27/34; B32B 27/36; B32B 27/40; B32B 7/06; B32B 7/12; C09J 133/04; C09J 133/08; C09J 2301/122; C09J 2467/006; C09J 2477/006; C09J 7/29

See application file for complete search history.

(56) References Cited

U.S. PATENT DOCUMENTS

| | | | |
|---|---|---|---|
| 4,851,278 | A | 7/1989 | Enanoza |
| 6,797,280 | B1 | 9/2004 | Kitazono et al. |
| 9,486,982 | B2 | 11/2016 | Emslander et al. |
| 9,605,183 | B2 | 3/2017 | Henderson et al. |
| 9,982,167 | B2 | 5/2018 | Schuhmann et al. |
| 2007/0231571 | A1 | 10/2007 | Lane et al. |
| 2011/0236648 | A1 | 9/2011 | Condon et al. |
| 2013/0184394 | A1 | 7/2013 | Satrijo et al. |
| 2016/0186013 | A1 | 6/2016 | Henderson |
| 2016/0369132 | A1 | 12/2016 | Schuhmann et al. |
| 2017/0066218 | A1 | 3/2017 | Maligie |
| 2018/0117874 | A1 | 5/2018 | Rothbauer et al. |
| 2019/0156707 | A1 | 5/2019 | Rink |
| 2020/0156355 | A1 | 5/2020 | Johnson et al. |

FOREIGN PATENT DOCUMENTS

| | | | |
|---|---|---|---|
| JP | 2003276114 | A | 9/2003 |
| JP | 2011/001393 | A | 1/2011 |
| JP | 2017/500225 | B2 | 1/2015 |
| WO | 2006/042856 | A1 | 4/2006 |

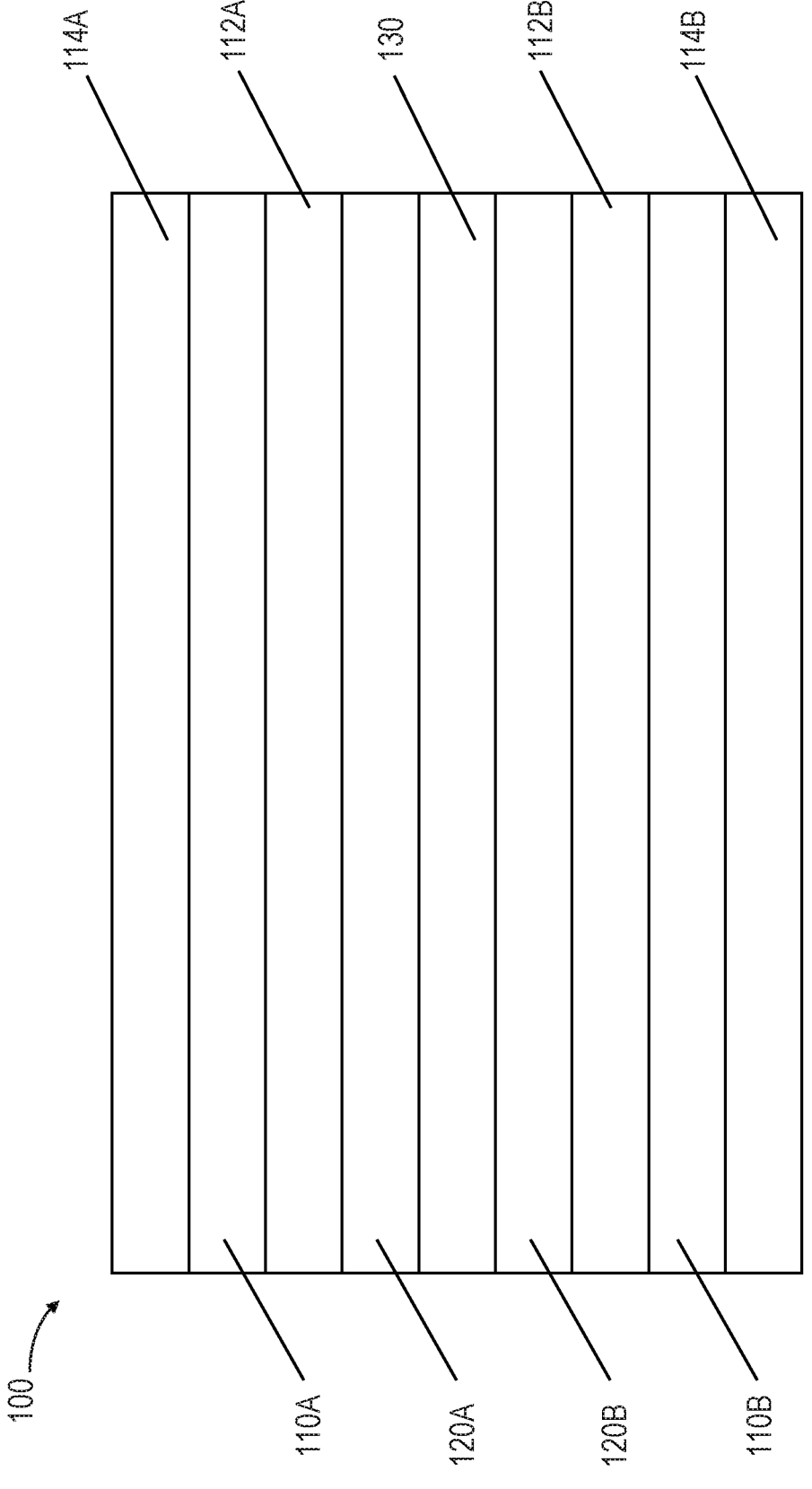

LINERLESS FILM STACK

BACKGROUND

Film stacks are used in many applications. For example, overlaminate film stacks, are used in graphics films applications to protect and add durability to the printed or otherwise imaged graphics film, especially the ink. Liners are typically used to protect any pressure sensitive adhesive prior to installation.

SUMMARY

In one aspect, the present description relates to a film stack. The film stack includes, in order, a first base substrate, a first pressure sensitive adhesive, a release layer, a second pressure sensitive adhesive, and a second base substrate. The first base substrate, the first pressure sensitive adhesive, the release layer, the second pressure sensitive adhesive, and the second base substrate are co-extrudable.

In another aspect, the present description relates to a method of forming a film. The method includes coextruding a melt stream, including, in order, a first base substrate, a first pressure sensitive adhesive, a release layer, a second pressure sensitive adhesive, and a second base substrate. The method includes expanding the melt stream and quenching the melt stream to form a film.

BRIEF DESCRIPTION OF THE DRAWINGS

FIG. 1 is a schematic side elevation cross-section of a film stack.

DETAILED DESCRIPTION

Film stacks may be used in many different situations to deliver a film in the appropriate format to a user. In some cases, the film includes an adhesive and the stack is designed to protect the adhesive during transportation, storage, or converting. In many cases, these film stacks include a paper or polymeric liner attached to an otherwise exposed adhesive face. Paper liners or polymeric materials are conventionally formed in a different step. This typically requires an additional manufacturing and attachment step, which can add complexity to the process of manufacturing.

In some embodiments, these film stacks may be paint protective films or other surface protective films. In certain cases, these film stacks may be or include graphics films or overlaminates. Overlaminates are used with graphics films to protect or enhance the durability of printed base graphics films. Overlaminates may provide physical protection, such as against abrasion or ambient conditions. Overlaminates may help extend the usable or optimal lifetime of printed graphics film products. Conventionally, overlaminates are laminated to a printed base graphics film at or after the time of printing.

FIG. 1 is a schematic side elevation cross section of a film stack. FIG. 1 includes film stack 100 including first base substrate 110A, second base substrate 110B, first pressure sensitive adhesive 120A, second pressure sensitive adhesive 120B, release layer 130, optional first tie layer 112A, optional second tie layer 112B, optional first protective layer 114A, and optional second protective layer 114B.

First base substrate 110A and second base substrate 110B may be any suitable material and may be formed through any suitable process. In some embodiments, the first or second base substrate includes or in made from polyvinyl chloride. In some embodiments, the first or second base substrate includes polyurethane and cellulose acetate propionate or cellulose acetate butyrate. In some embodiments, the first or second base substrate layer includes or is made from a polyester or copolyester. In some embodiments, the first or second base substrate includes or is made from ionomer resin of a copolymer of ethylene and methacrylic acid. In some embodiments, the first or second base substrate includes or is made from ethylene vinyl acetate (EVA). In some embodiments, the first or second base substrate includes or is made from polycarbonate, polypropylene, polylactic acid or polystyrene. In some embodiments, the first or second base substrate layer includes or contains an elastomeric component. Block copolymers including polyamides and polyamides may be suitable. The particular material or combination of materials may be selected for their physical, optical, and/or rheological properties. In some embodiments, the first or second base substrate may include more than one layer, the more than one layer including the same or different materials. First base substrate 110A and second base substrate 110B may be formed from the same or similar materials in certain embodiments, or they may be formed from the same or different materials. In some embodiments, the first base substrate and the second base substrate may be the same thickness and material.

The first base substrate and second base substrate may have any suitable thickness, and may be formed through an extrusion (such as melt extrusion—also referred to as multi-layer cast film extrusion or just cast film extrusion—or blown film extrusion) process. In some embodiments, each of or either of the first base substrate and the second base substrate has a thickness of 25-100 micrometers. First base substrate and second base substrate may have a smooth surface structure or may have a textured surface structure.

Optional first protective layer 114A and optional second protective layer 114B may be any suitable material and may be formed from any suitable process. In some embodiments, the first protective layer or second protective layer is more rigid than the base substrates. In some embodiments, the protective layers may be or include a polyolefin such as polypropylene. In some embodiments, the protective layers may be or include any other suitable polymer, copolymer, or blend thereof. The optional protective layers may have any suitable thickness, including from 10-150 micrometers. The thickness and materials may be selected to impart sufficient stiffness to the film stack and maintain a moderate peel force for delamination. In some embodiments, the 90 degree peel force to delaminate may be between 50 and 100 grams per inch (approximately 20 to 40 grams per centimeter). The removable skin layer may be extruded (melt extrusion or blown film extrusion), solvent cast, or coated. In some embodiments, the optional first protective layer and the optional second protective layer may be the same material or may be different materials. In some embodiments, the optional first protective layer and the optional second protective layer may be the same material and thickness.

First pressure sensitive adhesive 120A and second pressure sensitive adhesive 120B are disposed between release layer 130 and, respectively first base substrate 110A or second base substrate 110B. The first and second pressure sensitive adhesive layers may be or include any suitable adhesive, including acrylic adhesives, epoxies, or optically clear adhesives. Particularly for transparent or translucent base substrates, the optical characteristics of the adhesive (typically high transmission, low haze, and high clarity) may be important to maintaining the overall appearance of the film in use.

In some embodiments, the first pressure sensitive adhesive or the second pressure sensitive adhesive may have sufficient structure to maintain its shape (i.e., to not flow) over a range of exposure temperatures and humidities. In some embodiments, the adhesives may be fully or partially crosslinked (if extruded, before or after extrusion). The adhesives may include a pigment, dye, or other colorant. In some embodiments, the thickness of the adhesives may be between 10 and 100 micrometers. In some embodiments, the adhesives may include partially embedded microbeads, made from materials such as glass, ceramic, or polymeric resin or agglomerations thereof held together with a suitable binder material. In some embodiments, the microbeads may be index matched to the structured adhesive and/or be transparent.

In some embodiments, the first pressure sensitive adhesive and the second pressure sensitive adhesive may be the same material or may be different materials. In some embodiments, the first pressure sensitive adhesive and the second pressure sensitive adhesive may be the same thickness and the same material.

Because the base substrate layers may not inherently bond well to the pressure sensitive adhesives, some embodiments may include optional first tie layer 112A and optional second tie layer 112B. The tie layer, also often called a primer or prime layer, may be any suitable substance or composition with any suitable thickness. The selection of the tie layer is to ensure sufficient adhesion (to prevent ply-bold failure) between a base substrate layer and a pressure sensitive adhesive. In some embodiments, the tie layers may include a polyamide or copolyamide. Certain materials may be alternatively or additionally useful as a barrier layer to prevent the migration of plasticizer, water, solvent, or other contaminants from the front side of the film stack into the adhesive. The tie layer may be extremely thin: less than 10 micrometers thick, less than 6 micrometers thick, less than 5 micrometers thick, less than 4 micrometers thick, less than 3 micrometers thick, less than 2 micrometers thick, or even less than 1 micrometer thick. Tie layers can be solvent cast, coated, or even extruded or coextruded (with one or more of the other layers).

Release layer 130 may be provided as part of film stack 100 to protect the first and second pressure sensitive adhesive from unintentional self-adhesion, if the two portions are intended to be separated near or at the time of application. Release layer 130 may be silicone, a wax, a block copolymer, or any other suitable material. In some embodiments, it may be advantageous to use a release layer instead of a traditional release liner. A release liner is conventionally thicker paper or polymeric material that has a thin coating for release properties. The bulk of the release liner is intended to prevent damage in storage and impart stiffness to the film construction. In embodiments described herein, because the release layer is embedded within the film stack, it does not need to provide mechanical, physical protection, and can be very thin. In some embodiments, release layer 130 may be 10-150 micrometers thick. Further, as a single layer versus a coated liner material, coextrusion in a single step may be more feasible with a release layer construction, versus a conventional coated release article which typically requires lamination. In some embodiments, the entire stack is symmetrical on both sides of the release layer, in terms of material composition and thickness.

Films described herein may enable simpler manufacturing steps. If an entire film stack is co-extrudable (melt or blown film extrusion), multiple coating and/or laminations steps are not necessary during manufacture. Moreover, without the necessity for a release coating to be carried by a liner substrate, such constructions may enable thinner film constructions that can be manufactured at higher speeds. Such film stacks may provide greater economy (functionally two useful films for a given area) and reduced waste (a single release layer for two films in contrast to a release liner for two separate films). Finally, if such films are converted to form similar parts (for example, in the case of a paint protection film where one or more vehicle surfaces may be identically or symmetrically shaped), a single converting step may result in two films rather than one.

Any suitable method may be used to form film stacks described herein. Certain embodiments described herein may be especially suitable to coextrusion and/or blown film processes. In some embodiments, this includes coextruding a melt stream including a first base substrate, a first pressure sensitive adhesive, a release layer, a second pressure sensitive adhesive, and a second base substrate, expanding the melt stream—for example through air pressure in a blown film process, or through stretching—and quenching the melt stream, either through exposure to air, contact with a chilled roll, or other method to form a film. The film can be rolled up to form a roll. In some embodiments, the melt stream may include the optional tie layers or optional protective layers described in conjunction with FIG. 1.

The terms and expressions that have been employed are used as terms of description and not of limitation, and there is no intention in the use of such terms and expressions of excluding any equivalents of the features shown and described or portions thereof, but it is recognized that various modifications are possible within the scope of the embodiments of the present invention. Thus, it should be understood that although the present invention has been specifically disclosed by specific embodiments and optional features, modifications and variations of the concepts herein disclosed may be resorted to by those of ordinary skill in the art, and that such modifications and variations are considered to be within the scope of embodiments of the present invention.

EXAMPLES

Seven-layer gas-expanded co-extruded film construction was produced. The film was separated, and peel force was measured.

These examples are merely for illustrative purposes only and are not meant to be limiting on the scope of the appended claims. All parts, percentages, ratios, etc. in the examples and the rest of the specification are by weight, unless noted otherwise. The following abbreviations are used herein: um=micrometer, in=inch, mm=millimeter, cm=centimeter, ° C.=Centigrade, min=minute, kg=kilogram, g=grams, % RH=percent relative humidity. Materials:

TABLE 1

| Materials List | |
|---|---|
| Material | Source |
| SURLYN 1706 Ionomer | DuPont Company, Wilmington, Delaware |
| PEBAX 3533 | Arkema S.A., Colombes, France |
| INFUSE 9507 | The Dow Chemical Company, Midland, MI |
| Functional Layer | Prepared as described in Synthesis Example S1 of U.S. Pat. Pub. No. 2013/0184394 A1 (Satrijo et al.) except that the composition was as follows: the package was filled with |

TABLE 1-continued

| Materials List | |
|---|---|
| Material | Source |
| | 94.5 IOA (Isoocyl acrylate) and 5.5 parts of AA (Acrylic Acid). |

Test Methods:
Peel Test

The specimens were kept in constant temperature/humidity (23° C. and 50% RH) room for 24 hours before the test. Specimens of 10 in (25.4 cm) (machine direction)×1 in (2.54 cm) (transverse direction) were cut from the middle of experimental samples. The bottom layer (7) was laminated using 3M Removable Repositionable Tape 9415PC (3M Company, St. Paul, MN) to a 1 mm×55 mm×350 mm aluminum panel that had been wiped clean twice with IPA. The film was rolled down with 3 passes of a 2.05 kg hard rubber roller. The panel with the sample was conditioned at room temperature (about 23° C.) for about 15 minutes. The top half (3 layers) was separated from the release layer (INFUSE 9507 layer), exposing Functional Layer. The top half (3 layers) was connect to the jaws of the peel tester (Model #80-91-00-001 by made by Testing Machines, Inc. (New Castle, DE 19720 USA)) such that they were pulled off at a 90° angle at a speed of 30.5 cm per minute (12 in per min). The results were measured in grams. The values are an average of three tests for each sample.

Examples

Examples were produced on seven-layer pancake stack die (Type LF-400 Coax 7-layer from Labtech Engineering). Airflow to the die was manually controlled to achieve an expansion ratio of approximately 2:1. The air-expanded extrudate was subsequently collapsed approximately ten feet (3 meters) above die, traversed through rollers then wound onto a 3-inch (7.6 cm) core and rolled up. The feed materials were supplied by 7 independent 20 mm diameter extruders (Labtech Scientific Single Screw Extruder Type LE20-30/C HA). The Functional Layer material (Layer 3 and 5) was introduced as described in Examples of U.S. Pat. No. 9,486,982 (Emslander, et al.).

TABLE 2

| Example list made by 7-layer Gas-expanded Co-extrusion | | | | | | |
|---|---|---|---|---|---|---|
| | Layer 1 | Layer 2 | Layer 3 | Layer 4 | Layer 5 | Layer 6 | Layer 7 |
| Example 1 | 25.4 um SURLYN 1706 | 7.6 um PEBAX 3533 | 25.4 um Functional Layer | 25.4 um INFUSE 9507 | 25.4 um Functional Layer | 7.6 um PEBAX 3533 | 25.4 um SURLYN 1706 |

Results:
Peel Force between the Functional layer and the Release Layer was 54 grams.

What is claimed is:
1. A film stack, comprising, in order:
a first base substrate;
a first pressure sensitive adhesive;
a release layer;
a second pressure sensitive adhesive;
a second base substrate;

wherein the first base substrate, the first pressure sensitive adhesive, the release layer, the second pressure sensitive adhesive, and the second base substrate are co-extrudable, further comprising at least one of a first protective layer disposed on the first base substrate opposite the first pressure sensitive adhesive and a second protective layer disposed on the second base substrate opposite the second pressure sensitive adhesive wherein the at least one of a first protective layer and the second protective layer includes a polyolefin.

2. The film stack of claim 1, further comprising at least one of a first tie layer between the first base substrate and the first pressure sensitive adhesive and a second tie layer between the second base substrate and the second pressure sensitive adhesive.

3. The film stack of claim 2, wherein the at least one of a first tie layer and the second tie layer includes a polyamide or copolyamide.

4. The film stack of claim 1, wherein the first base substrate and the second base substrate are the same material and thickness.

5. The film stack of claim 4, wherein the first base substrate and the second base substrate include polylactic acid.

6. The film stack of claim 4, wherein the first base substrate and the second base substrate include polyurethane.

7. The film stack of claim 4, wherein the first base substrate and the second base substrate include ionomer resin.

8. The film stack of claim 6, wherein the first base substrate and the second base substrate include a copolymer of ethylene and methacrylic acid.

9. The film stack of claim 4, wherein the first base substrate and the second base substrate include ethylene vinyl acetate.

10. The film stack of claim 1, wherein the first pressure sensitive adhesive and the second pressure sensitive adhesive are the same material and thickness.

11. The film stack of claim 10, wherein the first pressure sensitive adhesive and the second pressure sensitive adhesive are acrylic pressure sensitive adhesives.

12. The film stack of claim 1, wherein the film stack is symmetrical on both sides of the release layer, in terms of material composition and thickness.

13. The film stack of claim 1, wherein the release layer includes an olefin block copolymer.

14. The film stack of claim 1, wherein the release layer includes a silicone resin.

* * * * *